United States Patent [19]
Camps et al.

[11] Patent Number: 5,132,958
[45] Date of Patent: Jul. 21, 1992

[54] DISC-RECORD PLAYER HAVING RESILIENTLY SUPPORTED SUBFRAME

[75] Inventors: Libert H. A. M. Camps, Hasselt, Belgium; Petrus L. A. Rouws, Eindhoven, Netherlands; Omar P. L. P. Van Heusden, Hasselt, Belgium

[73] Assignee: U.S. Philips Corporation, New York, N.Y.

[21] Appl. No.: 595,113

[22] Filed: Oct. 9, 1990

[30] Foreign Application Priority Data

Jan. 31, 1990 [NL] Netherlands ............... 9000234

[51] Int. Cl.$^5$ ............ G11B 25/04; G11B 33/02; G11B 33/02
[52] U.S. Cl. ............... 369/77.10; 369/75.1; 369/77.2
[58] Field of Search ............ 369/75.1, 75.2, 77.1, 369/77.2; 360/99.01, 99.02, 99.06

[56] References Cited

U.S. PATENT DOCUMENTS

| | | |
|---|---|---|
| 4,509,158 | 4/1985 | Kang ................... 369/77.2 |
| 4,592,039 | 5/1986 | Toyogudir et al. ........ 369/75.2 |
| 4,710,910 | 12/1987 | Ejiri .................. 369/77.2 X |
| 4,727,444 | 2/1988 | Fukushima et al. ....... 369/75.2 |
| 4,764,917 | 8/1988 | Sugihara et al. ........ 369/77.1 |
| 4,979,161 | 12/1990 | Verhagen .............. 369/77.2 |

Primary Examiner—Stuart S. Levy
Assistant Examiner—tien Ba Pham
Attorney, Agent, or Firm—David R. Treacy

[57] ABSTRACT

The scanning unit and turntable of a disc-record player are carried on a subframe which is resiliently supported from the player frame. The subframe is locked to the frame during loading and unloading of a disc record, to simplify alignment of the turntable to the loading device. The subframe locking device includes a tilting element, preferably arranged at a side of the subframe which faces the loading opening. The tilting element pivots about an axis which is parallel to the supporting surface of the turntable, and moves a locking member toward and away from the turntable and scanning unit so as to lock and to unlock the subframe with respect to the frame.

16 Claims, 3 Drawing Sheets

1

DISC-RECORD PLAYER HAVING RESILIENTLY SUPPORTED SUBFRAME

BACKGROUND OF THE INVENTION

The invention relates to disc-record player comprising a frame, a scanning device, comprising a resiliently supported subframe with a scanning unit and a turntable having a supporting surface for a disc-shaped information carrier, a loading device for moving the information carrier to and away from the turntable, and a locking device for locking the subframe relative to the frame during the movement of the information carrier, the locking device includes locking means for cooperation with the subframe and arranged near two opposite sides of the subframe.

Such a disc-record player of this general type from EP-A-0,145,052 which corresponds to U.S. application Ser. No. 675,498 filed Nov. 28, 1984 now U.S. Pat. No. 4,979,161; (herewith incorporated by reference). The known disc-record player comprises a housing, a frame, and a resiliently supported subframe carrying a scanning device comprising a turntable and an optical head for scanning optically readable discs. The known disc-record player further comprises a loading device, which comprises a removable disc holder which can be inserted through a front opening in the housing and is movable towards the turntable in order to transfer an optical disc to the turntable, which disc holder comprises clamping members for holding the disc as it is transferred to the turntable. Two large plate-shaped sliding elements extend parallel to the subframe, which elements are coupled to the clamping members and each comprise a lock. The locks, which are situated at opposite sides of the subframe, serve to lock the subframe relative to the frame during transfer of the disc to the turntable. For this purpose the locks and the sides of the frame which face the locks are provided with corresponding pins and openings. The pins can be made to engage or to be disengaged from the openings by moving the sliding elements relative to each other to lock or unlock the subframe. A servo member driven by an electric motor comprises a plurality of control portions for controlling inter alia the movements of the clamping members and the locks.

The locking device, which has been designed specifically for and forms part of the special loading device of the known disc-record player, which device comprises a removable disc holder, is of rather intricate construction and is bulky as a result of the large sliding elements. Moreover, due to the position of the locking device relative to the subframe, the sliding elements occupy a substantial part of the overall height of the disc-record player. However, for some uses where only a limited overall height is desirable or even possible, for example if the player is to be built into a dashboard opening of standard dimensions, the prior-art construction may give rise to problems on account of the comparatively large height dimension.

SUMMARY OF THE INVENTION

It is an object of the invention to provide a disc-record player of the type defined in the opening paragraph, comprising a simple and compact device for locking the subframe of the scanning device during use of the loading device.

To this end the disc-record player in accordance with the invention includes a locking device having a tilting element arranged opposite one side of the subframe, supported in the frame and comprising at least one locking member, the tilting element being pivotable about a tilting axis which extends parallel to the supporting surface of the turntable and to the side, the tilting element being pivotable between a first position, in which the locking member engages with the subframe, and a second position, in which the locking member is disengaged from the subframe.

During scanning of the information carrier situated on the turntable, the locking member being in the disengaged second position, the subframe, which is supported relative to the frame in a resilient and, generally, in a damped manner, together with the turntable and the scanning unit which its supports can perform movements relative to the frame without being impeded by the loading device when the player is subjected to shocks or vibrations. During the movement towards the turntable the subframe is retained relative to the frame by means of the locking device, the tilting element being tilted from the second position to the disengaged first position, so that the turntable occupies a fixed and well-defined position relative to the frame. This guarantees a correct position of the turntable and the information carrier relative to each other when the information carrier is placed onto the turntable. When the information carrier is removed from the turntable it is also desirable that the subframe is locked to ensure a correct operation of the loading device and to preclude damaging of the information carrier.

The locking device of the disc-record player in accordance with the invention, which device comprises a small number of parts, can be manufactured cheaply and requires a minimal space, is very suitable for use in a comparatively small housing, for example the housing of a CD-player intended for use in cars. Moreover, the locking device is very suitable for locking the subframe for a longer or shorter time when no information carrier is present or being scanned, so that the resilient suspension is relieved, which is of particular advantage in the case of mobile disc-record players.

In order to obtain a linear or substantially linear movement of the locking member during tilting of the tilting element, an illustrative embodiment of the disc-record player in accordance with the invention is characterized in that a locking element is pivotably connected to the tilting element and carries the locking member, the locking element being pivotable about a pivotal axis which extends parallel to the tilting axis of the tilting element and a guiding mechanism being provided for guiding the locking element during tilting of the tilting element.

In a practical simple-to-realize embodiment the guiding mechanism comprises an arm secured to the locking element and, cooperating with the arm, a guiding edge of the frame. The guiding edge is preferably straight.

Another illustrative embodiment of the disc-record player in accordance with the invention wherein the disc-record player comprises a housing having an opening for moving the information carrier into and out of the housing, is characterized in that the tilting element of the locking device is situated opposite that side of the subframe which faces the opening in the housing, a locking unit comprising a further locking member of the locking device being arranged near that side of the subframe which is remote from the opening. In this embodiment the locking means are situated at the front and rear of the subframe, viewed from the opening, i.e. the front opening, of the disc-record player, which is advantageous in order to obtain a housing of small width.

A locking device which functions accurately under all conditions is obtained with an embodiment in which the disc-record player comprises a command element, the locking unit is pivotally supported in the frame, and both the tilting element and the locking unit are coupled to the command element.

A further illustrative embodiment, in which the tilting element can perform a double function in a surprisingly simple manner, is characterized in that the tilting element is provided with a rotatably supported drive roller for cooperation with a radial surface of the information carrier in order to realize the movement of the information carrier towards and away from the turntable.

It is to be noted that the use of a pivotally arranged drive roller in a loading mechanism of a CD-player is known per se from EP-A-0,296,829.

BRIEF DESCRIPTION OF THE DRAWINGS

The invention will now be described in more detail, by way of example, with reference to the drawings in which.

DETAILED DESCRIPTION OF PREFERRED EMBODIMENT

Figure 1:
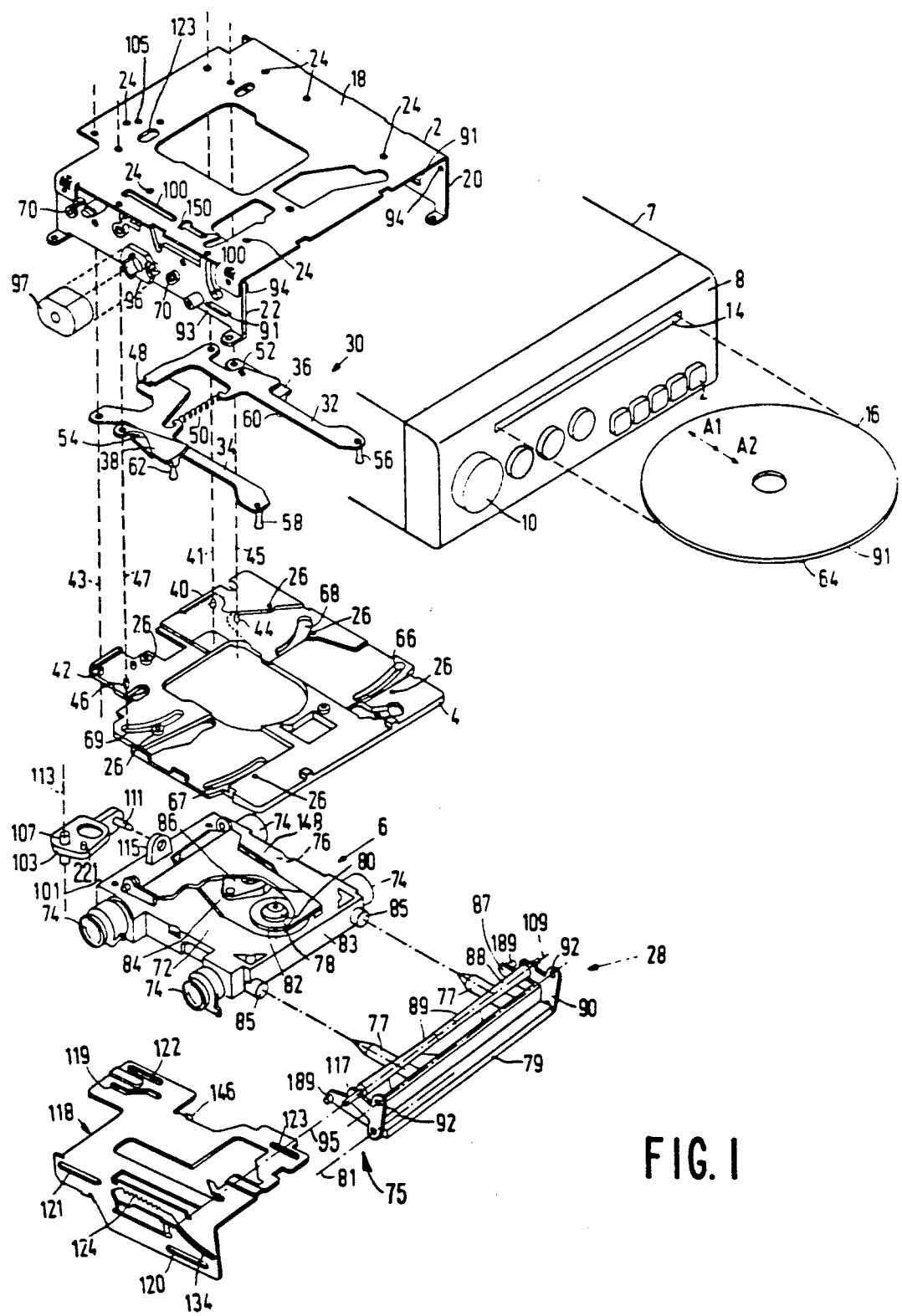
FIG. 1 is an exploded view of the disc-record player in accordance with the invention, the player having a locking device comprising a tilting element.

The disc-record player in accordance with the invention shown in FIG. 1 is intended for inscribing and/or reading optical information carriers, such as CDs and CD-singles. The disc-record player comprises a frame made up of a partly metal first frame section 2 and a flat plastics second frame section 4, and an optical scanning device 6 secured to the frame section 4. The frame 2, 4 is accommodated in a casing or housing 7 having a front wall 8. The front wall 8, which carries control knobs and keys 10 and 12, is formed with a slot 14 for moving an optical disc 16, for example a CD, into and out of the disc-record player in a loading direction A1 and an unloading direction A2 respectively.

The frame section 2 comprises a main wall 18 and two side walls 20 and 22. The main wall 18 has six holes 24 corresponding to six holes 26 in the frame section 4. The frame section 4 is secured to the inner side of the main wall 18 of the frame section 2 by bolts, now shown, passed through the holes 24 and 26.

The disc-record player shown in FIG. 1 further comprises a loading device 28 with a centering device 30. The centering device 30 comprises a first pair of pivotal arms 32 and 34 and a second pair of pivotal arms 36 and 38. The first pivotal arms 32 and 34 are supported on the frame section 4 by means of journals 40 and 42 so as to be pivotable about pivotal axes 41 and 43 respectively. The second pivotal arms 36 and 38 are supported on the frame section 4 by means of journals 44 and 46 respectively so as to be pivotable about pivotal axes 45 and 47 respectively. A tension spring 50 is arranged between the first pivotal arms 32 and 34, which are movably coupled to each other by means of a pin-slot linkage 48. The second pivotal arms 36 and 38 are movably coupled to the first pivotal arms 32 and 34 respectively by means of two pin-slot linkages 52 and 54. The first pivotal arms 32 and 34 comprise a centering element 56 and 58 respectively and the second pivotal arms 36 and 38 comprise centering elements 60 and 62. The centering elements 56, 58, 60 and 62, which are adapted to cooperate with a circumferential edge 64 of the optical disc 16, are constructed as rollers, the central axes of the centering elements 56, 58, 60 and 62 extending parallel to the pivotal axes 41, 43, 45 and 47. The frame section 4 is formed with four slots 66, 67, 68 and 69 through which the centering elements 56, 58, 60 and 62 project to allow them to cooperate with the circumferential edge 64.

The optical scanning device 6, which is of a type know per se, for example as disclosed in U.S. Pat. No. 4,403,316; (herewith incorporated by reference) has a subframe 72, which is connected to the frame section 2 by means of four pins, which are passed through holes 70 in the side walls 20 and 22 of the frame section 2, and four resilient and damping elements 74. The scanning device 6 comprises a turntable 78 which is rotatable about an axis of rotation 76 and which comprises a centering mandrel 80 and a supporting surface 82 for an optical disc. The axis of rotation 76 extends parallel to the mutually parallel pivotal axes 41, 43, 45 and 47. The scanning device 6 further comprises a scanning unit 84, which comprises an objective and which in the present example is secured to an electromagnetically drivable pivotal arm 86.

The loading device 28 comprises a drive roller 88, which is rotatably journalled in a tilting element 90. The tilting element 90 has two holes 92 which correspond to two holes 94 in the side walls 20 and 22 of the subframe 2, the tilting element 90 being supported by means of two trunnions extending through the holes 92 and 94. The roller 88 is driven by means of an electric motor 97 via a gear-wheel transmission, not shown, the motor being secured to a mounting portion 96 of the side wall 22 of the frame section 2.

An optical disc inserted through the front opening 14 in the wall 8 is positioned between the centering elements 56, 58, 60 and 62 of the centering device 28 and above the turntable 78 of the scanning device 6 by the drive roller 88, which is rotatable about an axis 109. During insertion of the optical disc 16 two slightly conical circumferential surfaces 89 of the roller 88 cooperate with a radial surface 91 of the optical disc, the optical disc being situated between the roller 88 and the frame section 4 and consecutively engaging with the first centering elements 56 and 58 and with the second centering elements 60 and 62. The loading movement ceases when the optical disc has reached the desired position relative to the turntable.

The disc-record player in accordance with the invention comprises a locking device 75 for locking the subframe 72 of the scanning device 6. In the present example the locking device 75 comprises two pin-shaped locking members 77 which are integral with a plastics locking element 79. The locking element 79 is movably connected to the tilting element 90, which forms part of the locking device, and is pivotable relative to the tilting element 90 about a pivotal axis 81. The tilting element 90 carrying the locking element 79 is situated between the front wall 8 and a side 83, i.e. the front side, of the subframe 72 which faces the opening 14 in the front wall. Opposite the locking members 77 two openings 85 are formed in the front side 83, which openings are engageable by the locking members 77 for the purpose of locking the subframe 72. For a well-defined movement of the locking members towards and away from the openings 85 during tilting of the tilting element 90 the locking element 79 comprises at least one limb 87 with a pin 189 engaging a slot 91 formed in the wall 22 of the frame section 2 and having a guiding edge 93.

Figure 2:
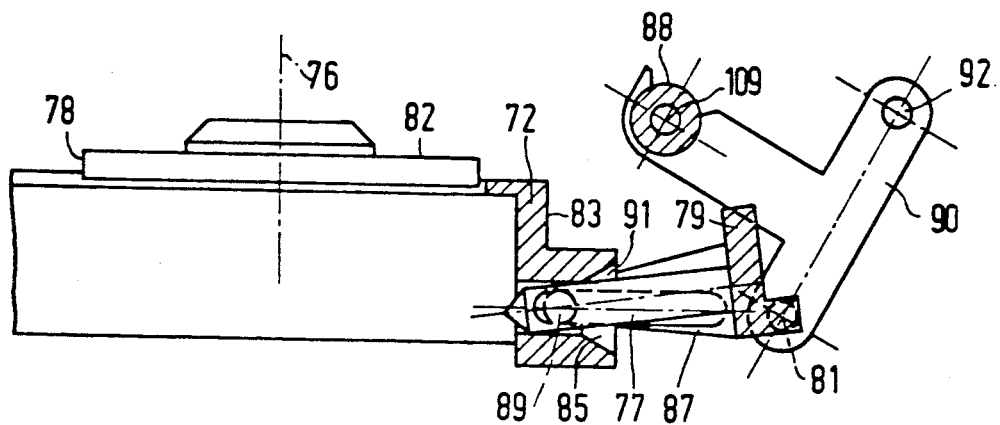
FIG. 2 is partly sectional view showing the tilting element in the engaged condition.
Figure 3:
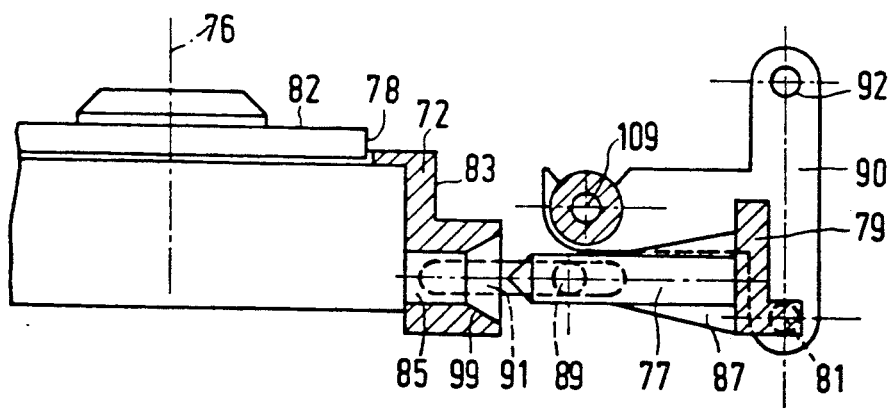
FIG. 3 shows the tilting element in the disengaged condition.

FIG. 2 shows the tilting element 90 of the locking device in a first position, in which the locking members 77 tightly fit the openings 85 in the subframe 72 and are thus coupled to the subframe 72. FIG. 3 shows the tilting element 90 in a second position, in which the subframe is not locked and the locking members are spaced at such a distance from the front side 83 of the subframe 72 to prevent shocks or vibrations to which the housing 7 may be subjected from being transmitted via the loading device 28. In order to guarantee a smooth engagement of the locking members 77 in the openings 85 these openings 85, which are formed in trunnions, are tapered at the entry side 99.

In most cases it will be desirable to lock the subframe completely relative to the frame 2, 4 during transfer of an optical disc to the turntable 78. Such a locking can be achieved if the locking members 77 can move the subframe 72 so far in the direction indicated by the arrow A1 that the side 101 of the subframe 72 which is remote from the opening 14, i.e. the rear side, can be pressed against a blocking element, not shown. In general, the resilient suspension of the subframe will not permit a large rearward displacement. For this reason the present example employs a pivotable locking unit 103 arranged near the rear side 101 if the subframe 72, which unit comprises a locking pin 111 and is supported in the frame 2, 4 via a pin 107 which engages a bearing opening 105. By a pivotal movement of the locking unit 103 about the axis 113 the locking pin 111 can engage with or can be disengaged from a coupling member 115 of the subframe 72.

The disc-record player shown in FIG. 1 comprises a command element 118 which is mounted on the frame section 2 so as to be movable in the directions indicated by the arrows A1 and A2. For this purpose the command element 118 has four guide slots 120, 121, 122 and 123 engaged by guide pins on the main wall 18 and the side wall 22 of the frame section 2. The command element 118 is driven by the electric motor 97 via a partly shown gear-wheel transmission 124.

Figure 5:
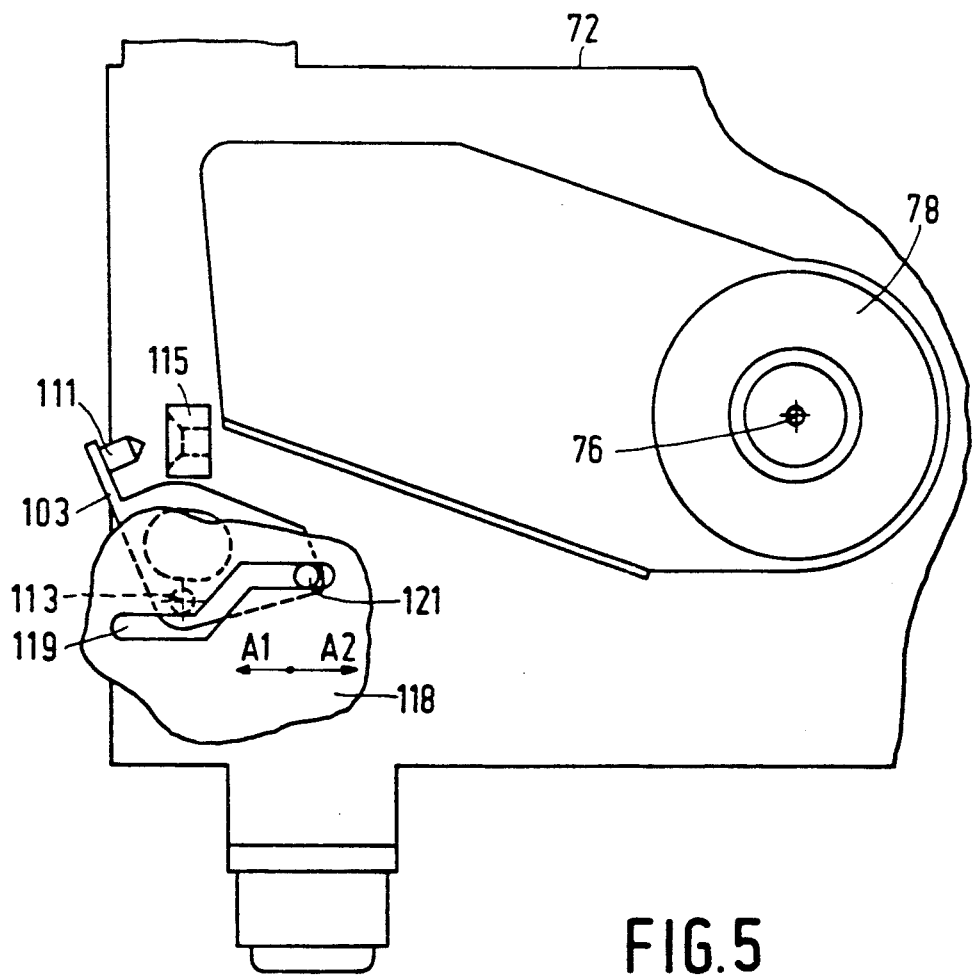
FIG. 5 is a plan view showing the part of FIG. 4 in the disengaged condition.

The command element 118 has an inclined slot 134 engaged by a journal 117 of the tilting element 90 and also has a slot 119 engaged by a journal 121 of the locking unit 103, which journal 121 extends through an opening 123 in the frame section 2. When the command element 118 is driven by the electric motor 97 after the optical disc 16 has been brought into the desired position relative to the turntable 78, the centering elements 56, 58, 60 and 62 are positioned at a desired distance from the disc by tilting of the tilting element 90 via a coupling, not shown, with the command element and the roller 88 during the movement of the command element 118 in the direction A1 and the locking members 77 are disengaged from the openings 85 by the pivotal movement of the tilting element 90 and the locking pin 111 is disengaged from the coupling member 115 on the subframe 72 by the pivotal movement of the element 103 in order unlock the subframe 72 relative to the frame 2, 4. Moreover, the optical disc is then pressed onto the supporting surface 82 of the turntable 78 by a disc-pressure member 148, for which purpose the command element comprises an actuating projection 146. The positions of the locking members 77 and the locking pin 111 when the subframe 72 is not locked are shown in FIGS. 3 and 5 respectively.

Figure 4:
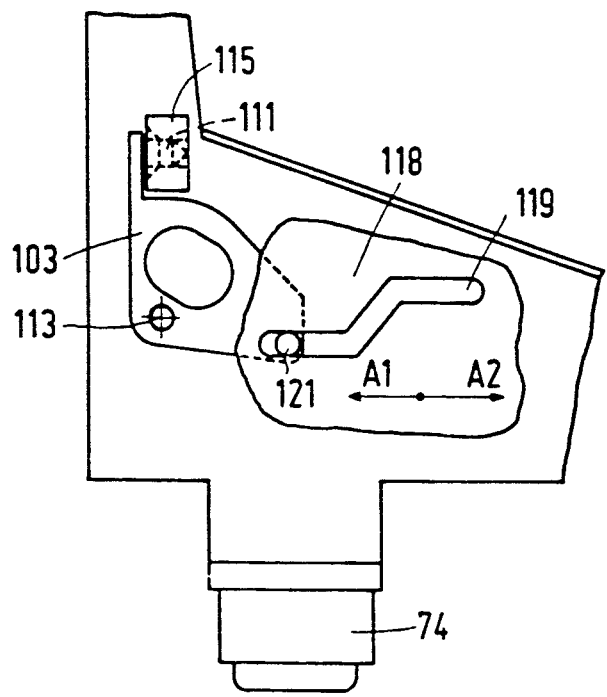
FIG. 4 is a plan view showing a part of the locking device in the engaged condition.

In order the remove an optical disc from the turntable 82 and move it outwards the command element 118 is moved in the direction indicated by the arrow A2 by means of the motor 97, the movement of the journal 117 in the slot 134 and the journal 121 in the slot 119 causing the locking members 77 and the locking pin 111 to be coupled to the subframe 72 by the pivotal movement of the tilting element 90 and of the locking unit 103 respectively. The positions of the locking members 77 and the locking pin 111 in the locked condition of the subframe are shown in FIGS. 2 and 4 respectively. During the movement of the command element 118 in the direction A2 the spring 50 arranged between the first pivotal arms 32 and 34 ensures that the centering elements 56, 58, 60 and 62 are moved towards the disc circumference. The spring 50 then provides enough spring force to move the disc which lies on the turntable so far along the axis of rotation 76 of the turntable 78 by means of the double conical centering elements 56, 58, 60 and 62 that the disc can be moved outwards over the centering cone 80 when the roller 88 is driven in the appropriate direction.

It will be appreciated that the invention is not limited to the illustrative embodiment shown in the drawings. For example, disc-record players comprising another loading device than shown herein and disc-record players constructed to inscribe and/or read magneto-optical discs also fall within the scope of the invention.

We claim:
1. A disc-record player comprising
a frame,
a scanning device, comprising a resiliently supported subframe with a scanning unit and a turntable having a supporting surface for a disc-shaped information carrier,
a loading device for moving the information carrier to and away from the turntable, and
a locking device for locking the subframe relative to the frame during said movement of the information carrier, the locking device comprising locking means for cooperation with the subframe, which means are arranged near two opposite sides of the subframe,
characterized in that the locking device comprises a tilting element arranged opposite one side of the subframe, supported in the frame, the tilting element being pivotable about a tilting axis which extends parallel to the supporting surface of the turntable and to said side,
at least one locking member,
means for guiding said locking member for movement toward and away from said scanning unit and turntable, and
means for coupling said locking member to said tilting element for said movement toward and away from said scanning unit and turntable, responsive to pivoting of the tilting element,
the tilting element being pivotable between a first position, in which the locking member engages with the subframe, and a second position, in which the locking member is disengaged from the subframe.

2. A disc-record player as claimed in claim 1, characterized in that a locking element is pivotably connected to the tilting element and carries the locking member, the locking element being pivotable about a pivotal axis which extends parallel to the tilting axis of the tilting element.

3. A disc-record player as claimed in claim 2, in which the disc-record player comprises a housing having an opening for moving the information carrier into and out of the housing, characterized in that the tilting element of the locking device is situated opposite a first side of the subframe which faces the opening in the housing, and the locking device comprises a further locking member arranged near a side of the subframe which is remote from said first side.

4. A disc-record player as claimed in claim 3, characterized in that the tilting element is provided with a rotatably supported drive roller for cooperation with a radial surface of the information carrier in order to guide movement of the information carrier towards and away from the turntable.

5. A disc-record player as claimed in claim 3, in which the disc-record player comprises a command element, characterized in that the locking member is pivotally supported in the frame, and both the tilting element and the locking member are coupled to the command element.

6. A disc-record player as claimed in claim 2, characterized in that said means for guiding comprises an arm secured to the locking element and, cooperating with said arm, a guiding edge of the frame.

7. A disc-record player as claimed in claim 6, in which the disc-record player comprises a housing having an opening for moving the information carrier into and out of the housing, characterized in that the tilting element of the locking device is situated opposite a first side of the subframe which faces the opening in the housing, and the locking device comprises a further locking member arranged near a side of the subframe which is remote from said first side.

8. A disc-record player as claimed in claim 7, characterized in that the tilting element is provided with a rotatably supported drive roller for cooperation with a radial surface of the information carrier in order to guide movement of the information carrier towards and away from the turntable.

9. A disc-record player as claimed in claim 7, in which the disc-record player comprises a command element, characterized in that the locking member is pivotally supported in the frame, and both the tilting element and the locking member are coupled to the command element.

10. A disc-record player as claimed in claim 3, characterized in that the guiding edge is at least substantially straight.

11. A disc-record player as claimed in claim 10, in which the disc-record player comprises a housing having an opening for moving the information carrier into and out of the housing, characterized in that the tilting element of the locking device is situated opposite a first side of the subframe which faces the opening in the housing, and the locking device comprises a further locking member arranged near a side of the subframe which is remote from said first side.

12. A disc-record player as claimed in claim 11, characterized in that the tilting element is provided with a rotatably supported drive roller for cooperation with a radial surface of the information carrier in order to guide movement of the information carrier towards and away from the turntable.

13. A disc-record player as claimed in claim 11, in which the disc-record player comprises a command element, characterized in that the locking member is pivotally supported in the frame, and both the tilting element and the locking member are coupled to the command element.

14. A disc-record player as claimed in claim 1, in which the disc-record player comprises a housing having an opening for moving the information carrier into and out of the housing, characterized in that the tilting element of the locking device is situated opposite a first side of the subframe which faces the opening in the housing, and the locking device comprises a further locking member arranged near a side of the subframe which is remote from said first side.

15. A disc-record player as claimed in claim 14, in which the disc-record player comprises a command element, characterized in that the locking member is pivotally supported in the frame, and both the tilting element and the locking member are coupled to the command element.

16. A disc-record player as claimed in claims 5 or 15, characterized in that the tilting element is provided with a rotatably supported drive roller for cooperation with a radial surface of the information carrier in order to guide the movement of the information carrier towards and away from the turntable.

* * * * *